(12) United States Patent
Holz et al.

(10) Patent No.: US 8,229,701 B1
(45) Date of Patent: Jul. 24, 2012

(54) SYSTEM AND METHOD FOR MEASURING AN OBJECT'S CENTER OF GRAVITY

(75) Inventors: Kevin F. Holz, San Diego, CA (US); Aaron Burmeister, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 343 days.

(21) Appl. No.: 12/777,367

(22) Filed: May 11, 2010

(51) Int. Cl.
 *G06F 7/00* (2006.01)
(52) U.S. Cl. ..... 702/173; 73/65.03; 73/65.01; 73/65.07; 701/120; 701/124
(58) Field of Classification Search .................. 702/173; 73/65.03, 65.01, 65.06, 65.07; 33/508; 701/16, 701/18, 120, 124; 177/145, 150; 700/228, 700/213, 230; 198/572, 597, 598
See application file for complete search history.

(56) References Cited

U.S. PATENT DOCUMENTS

| | | | |
|---|---|---|---|
| 5,136,513 A | 8/1992 | Sol et al. | |
| 5,177,998 A | 1/1993 | Monk | |
| 5,301,544 A * | 4/1994 | Smith | 73/65.07 |
| 5,331,118 A * | 7/1994 | Jensen | 177/25.14 |
| 5,340,950 A * | 8/1994 | Brandorff et al. | 177/145 |
| 5,408,054 A * | 4/1995 | Brandorff et al. | 177/145 |
| 5,528,927 A | 6/1996 | Butler et al. | |
| 5,672,815 A * | 9/1997 | Prutu | 73/65.07 |
| 6,053,033 A | 4/2000 | Kuhlmann et al. | |
| 6,237,407 B1 * | 5/2001 | Nance | 73/178 T |
| 6,273,514 B1 * | 8/2001 | Hulsing, II | 310/306 |
| 6,564,142 B2 * | 5/2003 | Godwin et al. | 701/124 |
| 6,690,995 B2 * | 2/2004 | Prutu | 700/228 |
| 6,952,628 B2 * | 10/2005 | Prutu | 700/228 |
| 7,415,866 B2 * | 8/2008 | Latiri | 73/65.03 |
| 2004/0162632 A1 | 8/2004 | Prutu | |
| 2007/0186626 A1 * | 8/2007 | Latiri | 73/65.01 |

* cited by examiner

*Primary Examiner* — Carol Tsai
(74) *Attorney, Agent, or Firm* — Ryan J. Friedl; Kyle Eppele

(57) ABSTRACT

A system and method are provided for measuring an object's center of gravity. The system includes a bed for supporting the object in an immovable position. The bed is tiltably attached to a frame that is supported near at least a first and a second edge by at least one force measuring device per edge. The bed is tiltable about one of the edges. A processor is connected to each force measuring devices and is configured to process force measurement data collected therefrom. The processor is configured to calculate the object's center of gravity along a z-axis based on a ratio of a cosine of the bed's angle of tilt multiplied by the center of gravity of the object along a y-axis in a flat configuration minus the center of gravity of the object along the y-axis in a tilted configuration to the sine of the angle of tilt.

20 Claims, 4 Drawing Sheets

SYSTEM AND METHOD FOR MEASURING AN OBJECT'S CENTER OF GRAVITY

FEDERALLY-SPONSORED RESEARCH AND DEVELOPMENT

The System and Method for Measuring an Object's Center of Gravity is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email sscpac_T2@navy.mil. Reference Navy Case Number 100011.

BACKGROUND

The three-dimensional center of gravity (hereinafter referred to as "CG") of an object can be calculated using a single static platform. However, in this case, the object must still rotate relative to the plane normal to the gravity vector. This method calculates two separate two-dimensional centers of gravity while the object is balanced on two unique planes. Two unique lines are created beginning from each 2D center of gravity and extending in the directions normal to the respective planes on which the object sits. The intersection of these two lines gives the three dimensional center of gravity. One major disadvantage of this method is that many objects do not have two unique planes that can hold the object at equilibrium. This introduces many measuring inaccuracies and will also create imprecise results. Another disadvantage is that two disparate sets of constraint equipment will be required to hold the object in the two positions.

Another prior method of measuring CG is the "hang from a string" method. The hang from a string method also requires two unique lines through an object to calculate the 3D CG. If an object is hung by a single string, the CG of the object will fall inline with the string supporting the object. Once the object has been hung from two separate locations on its body, the two unique lines will intersect at the three dimensional CG of the object. This method is inaccurate for many reasons. There is no straightforward way to measure the direction of the unique lines as they pass through the object, hence the intersection of the two lines will have great inaccuracies. Additionally, this method is not practical for objects weighing more than ten or fifteen pounds as it becomes very hard to lift and manipulate them correctly using a thin cable.

Based on volume and density characteristics, many Computer Aided Design ("CAD") programs can accurately and precisely calculate the center of gravity of a single object or of an assembly of objects. This method is recommended for very well defined systems, where parts are accurately modeled, material properties are well defined, and all of the system's components are included in the CAD model. However, many real world objects are made of literally thousands of components that have unknown geometries and or material properties. In many cases, it is not feasible (or even impossible) to manually define the shapes and densities as required to create an accurate CG location. A final disadvantage of this system is that it cannot account for parts with variable densities.

SUMMARY OF SOME EMBODIMENTS

In some embodiments, the system includes a bed for supporting the object in an immovable position. The bed is attached to a frame that is supported near at least a first edge and a second edge by at least one force measuring device per edge. The bed is tiltable about one of the edges. The system also includes a processor for processing force measurement data collected from each force measuring device. The processor is configured to calculate the object's center of gravity along a z-axis based on a ratio of a cosine of the bed's angle of tilt multiplied by the center of gravity of the object along a y-axis in a flat configuration minus the center of gravity of the object along the y-axis in a tilted configuration to the sine of the angle of tilt.

An embodiment of a method for measuring an object's center of gravity includes the steps of placing the object on a flat bed that is tiltably attached to a frame (the frame is supported at extreme ends by a plurality of force measuring devices); collecting data from the force measuring devices to determine the object's center of gravity along an x-axis and the object's center of gravity along a y-axis; tilting the flat bed to a defined angle; collecting data from the force measuring devices to determine the object's center of gravity along a tilted-y-axis; and calculating the object's center of gravity along a z-axis based on a ratio of a cosine of the bed's angle of tilt of the bed multiplied by the center of gravity of the object in a y-axis in a flat configuration minus the center of gravity of the object in the y-axis in a tilted configuration to the sine of the angle of tilt.

DETAILED DESCRIPTION OF SOME EMBODIMENTS

Figure 1:
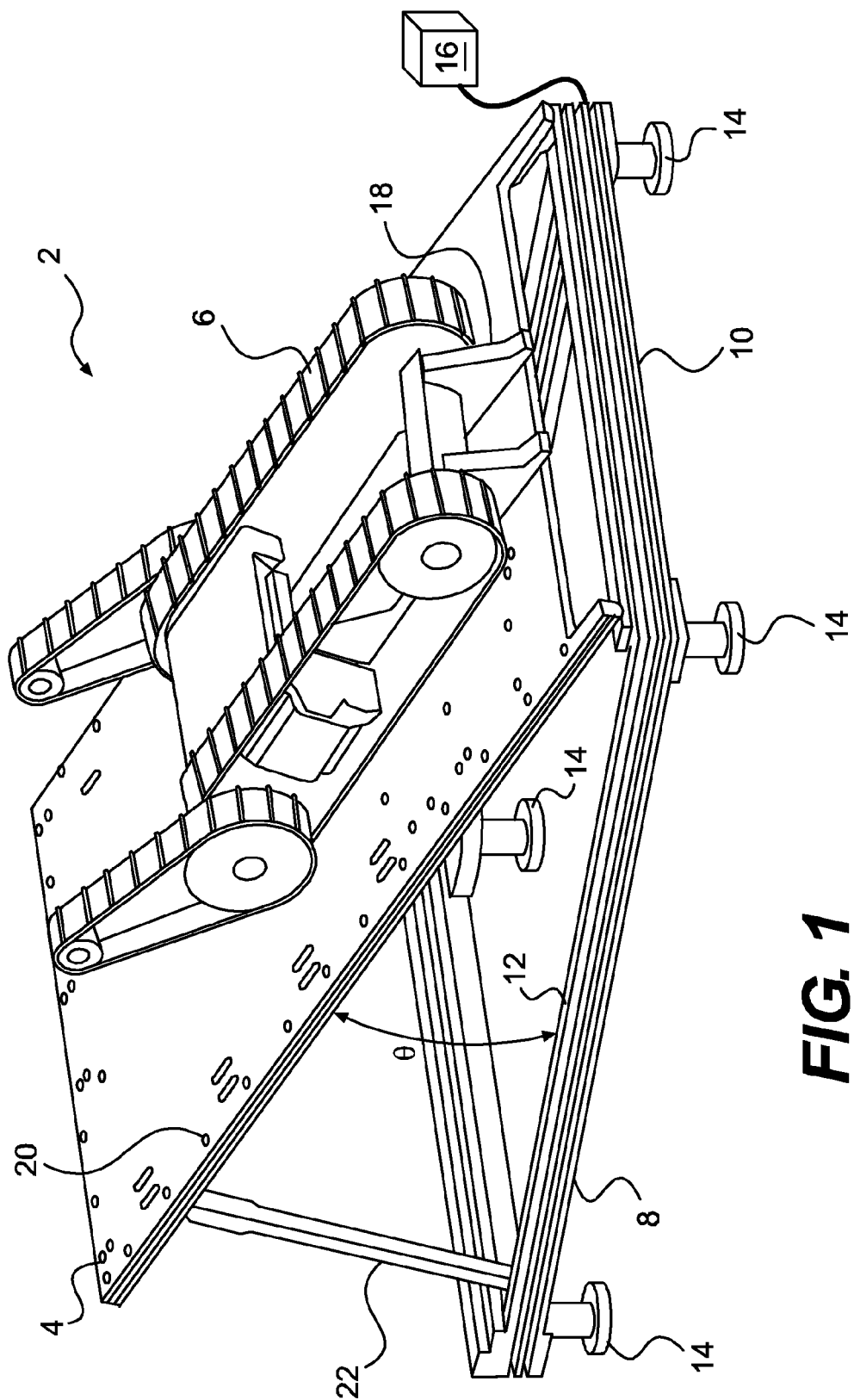
FIG. 1 shows an embodiment of a system for measuring an object's center of gravity with a subject object placed on the system's bed.
Figure 2:
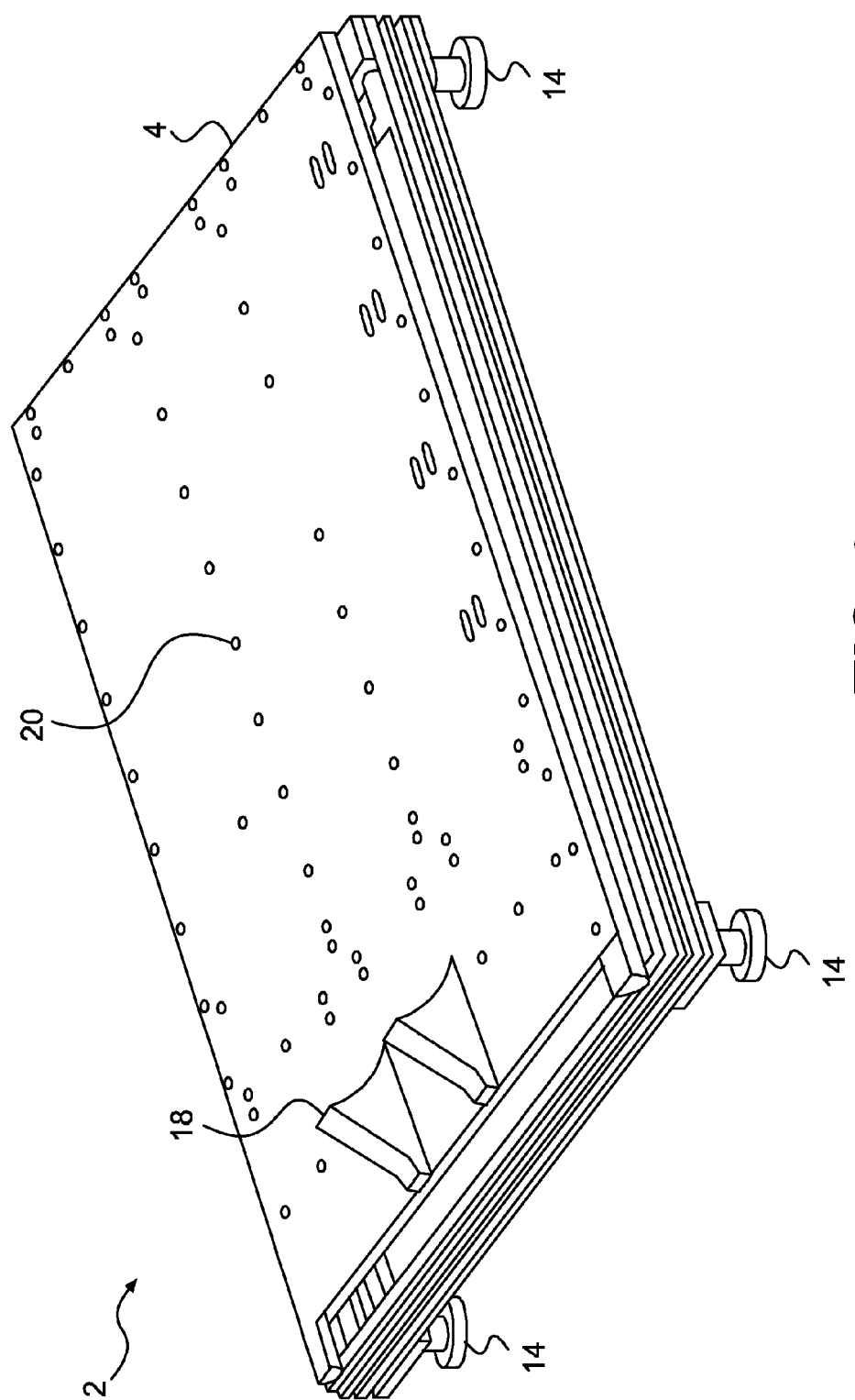
FIG. 2 shows an embodiment of a system for measuring an object's center of gravity with the bed in a flat configuration.
Figure 3:
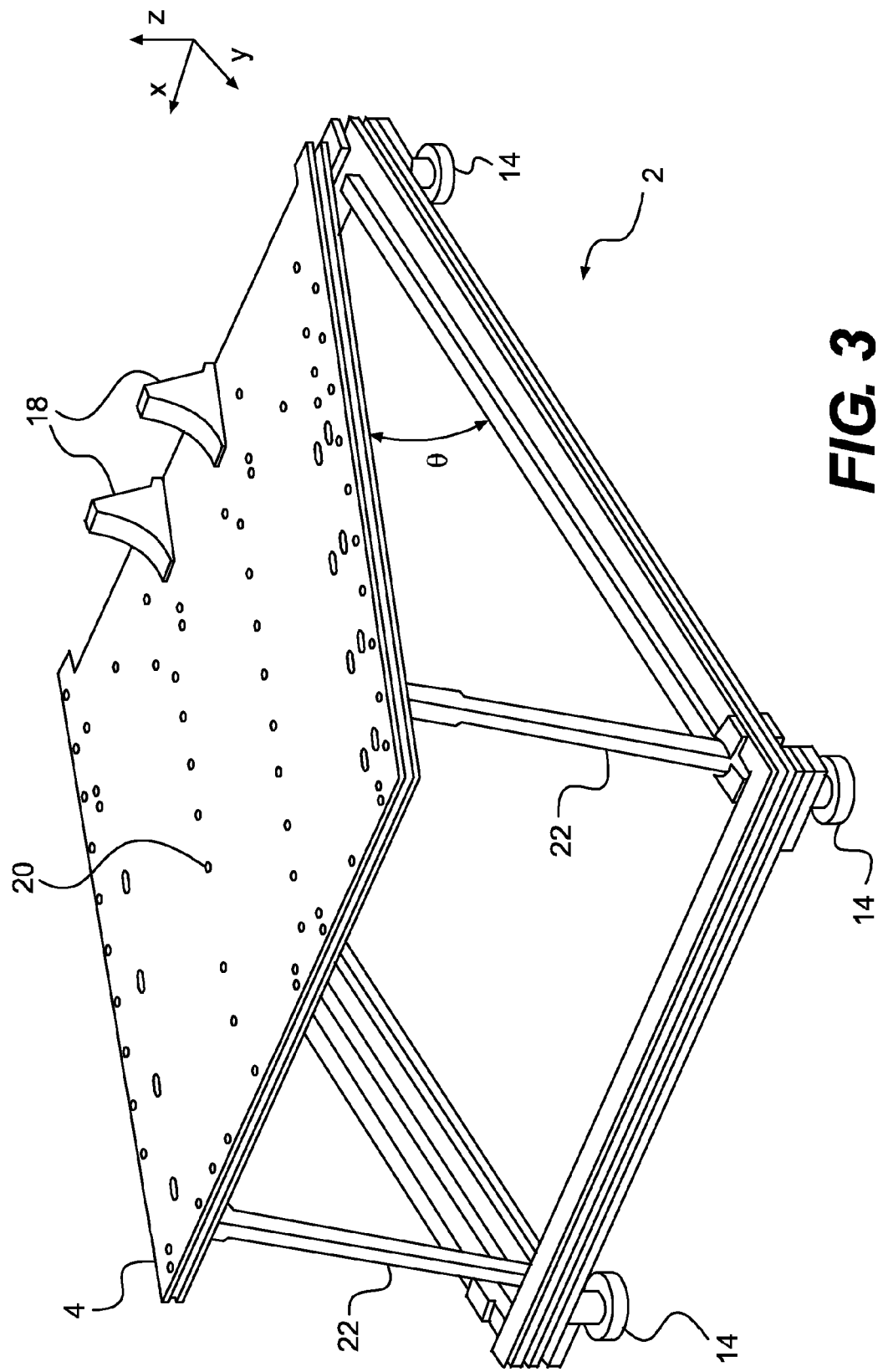
FIG. 3 shows an embodiment of a system for measuring an object's center of gravity with the bed in a raised configuration.

With reference to FIGS. 1-3, the system 2 generally includes a bed 4 for supporting an object 6 in an immovable position. The bed 4 is attached to a frame 8 that is supported near at least a first edge 10 and a second edge 12 by at least one force measuring device 14 per edge. The bed 4 is tiltable about one of the edges. The system 2 also includes a processor 16 for processing force measurement data collected from each force measuring device 14. The processor 16 is configured to calculate the object's center of gravity along a z-axis based on a ratio of a cosine of the bed's angle of tilt multiplied by the center of gravity of the object along a y-axis in a flat configuration minus the center of gravity of the object along the y-axis in a tilted configuration to the sine of the angle of tilt. Thus, the processor 16 implements the following equation:

$$CG_{z\_Flat} = [\cos\theta * CG_{y\_Flat} - CG_{y\_Angled}]/\sin\theta \qquad (1)$$

The greater the angle $\theta$, the more accurate the center of gravity calculation will be. As the calculation of the center of gravity depends on the angle $\theta$ of the bed 4 relative to the frame (and more particularly relative to a plane normal to the gravity vector), the bed 4 should be tiltable along only one axis. That way, the center of gravity and the x-axis will remain constant and only the center of gravity in the y-axis will be affected by the tilt. Also, it is beneficial to reduce the amount of freedom in any axis because the lower the degree of freedom in any axis—x, y or z, the lower the amount of measurement inaccuracy due to relative motion of the object and measuring device that will be detected by the force measuring devices 14.

The bed 4 can be any shape or cross-section and density. Holes 20 can be drilled into the bed 4 to decrease the amount of weight of the bed 4, thereby decreasing the effect of the bed 4 on the force measuring devices 14. The holes can also be used to secure the object 6 to the bed 4. In any event, the bed 4 should be rigid enough so that the position of the object 6 relative to the bed 4 is not disturbed when tilting the bed from a horizontal position to a tilted position. Any sag in the bed 4 could cause the calculation of the height of the center of gravity to be distorted.

To help maintain the object in a fixed position, a stop 18 is fixedly attached to the bed 4 for preventing slip of the object 6 between the flat and tilted configurations. A more rigid configuration is preferable as this will resist bending moments. The stop 18 should be secure to the bed 4 by pegs or screws (not shown) that interact with holes 20. However, a person having ordinary skill in the art will understand that the stop 18 can be secured to the bed by any other securing means as long as the stop 18 does not shift when the bed 4 is repositioned from a flat configuration to a tilted configuration. Also, the stop 18 should be shaped so that it conforms to the shape of the object 6. Thus, any moment on the stop 18 would be reduced as force from the object 6 is more evenly distributed along the length of the stop 18. Also, a stop 18 being rigid and having a shape or profile conforming to the shape or profile of the object 6 being measured makes the measurement of the center of gravity of the object 6 repeatable.

The system 2 and the bed 4 should be parallel to a plane that is normal to the gravity vector. The system 2 is shown in FIG. 2 with the bed 4 in a flat configuration. It is when the system 2 is in this configuration that the bed 4 should lie in a plane that is normal to the gravity vector. Offset to the gravity vector can negatively influence the calculations. However, such a negative influence can be corrected by mathematical calculation if necessary. Two level indicators can be placed on the frame, each in a direction of the x- and y-axes to indicate whether the plane of the bed is not perpendicular to the gravity vector. The level indicators can also be configured to provide an indication to the processor 16 of the angle that the bed is offset from the plane perpendicular to the gravity vector. A dynamometer would help compensate for the bed 4 not being perpendicular to the gravity vector; however, the location of where the gravity vector intersects the bed 4 must be determined to compensate for the offset.

The frame 8 is shown in the accompanying figures as rectangular with four force measuring devices 14. However, a person having ordinary skill in the art will understand that any shaped frame can be used in system 2. Also, less than four force measuring devices 14 are possible as long as an x and a y center of gravity can be determined. In the present system, however, a first, a second, a third and a fourth force measuring device 14 are used to determine the centers of gravity of an object 6 in the x and y directions using the following equations:

$$CG_{x\_Left\ Axis}=B*[F_{BR}+F_{FR}]/[F_{BR}+F_{BL}+F_{FR}+F_{FL}]; \quad (2)$$

$$CG_{x\_Right\ Axis}=B-[B*[F_{BL}+F_{FL}]/[F_{BR}+F_{BL}+F_{FR}+F_{FL}]]; \quad (3)$$

$$CG_x=[CG_{x\_Left\ Axis}+CG_{x\_Right\ Axis}]/2; \quad (4)$$

$$CG_{y\_Back\ Axis}=L*[F_{FR}+F_{FL}]/[F_{BR}+F_{BL}+F_{FR}+F_{FL}]; \quad (5)$$

$$CG_{y\_Front\ Axis}=L-[L*[F_{BR}+F_{BL}]/[F_{BR}+F_{BL}+F_{FR}+F_{FL}]]; \text{ and} \quad (6)$$

$$CG_y=[CG_{y\_Back\ Axis}+CG_{y\_Front\ Axis}]/2; \quad (7)$$

where
B=width of the bed along the x-axis;
L=length of the bed along the y-axis;
$F_{FR}$=force data from front right force measuring device;
$F_{FL}$=force data from front left force measuring device;
$F_{BR}$=force data from back right measuring device; and
$F_{BL}$=force data from back left measuring device.

The force measuring device 14 is any device that can determine the weight of an object. It will be understood that as different objects are placed on the bed 4, each force measuring device 14 will experience a different application of force. Thus, through the equations shown above, the center of gravity can be calculated. The placement of each device should be outside the outermost boundary of the object regardless of the shape of the frame 8, i.e., triangular, pentagonal, etc., and of the number of force measuring devices 14, i.e., less or more than four devices. It is thereby more likely that a proper center of gravity of an object 6 will be obtained.

The processor 16 uses equations (2)-(7), when determining the center of gravity of the object along an x-axis. Equation (2) (and similarly equation (3)) is the result of a ratio between the sum of the force data of the first and third force measuring devices 14 (for the first horizontal side or the second and fourth measuring devices 14 for the second horizontal side) and the sum of the first, second, third and fourth measuring devices 14. Equation (4) is the result of the average between the center of gravities of the first horizontal side and the second horizontal side. Equation (5) (and similarly equation (6)) is the result of a ratio between the sum of the force data of the first and second force measuring devices 14 (for the first lateral side or the third and fourth lateral side for the second lateral side) and the sum of the first, second, third and fourth measuring devices. Equation (7) is the average between the center of gravities of the first and second lateral sides of the object 6.

The frame 8 is shown in the figure as being propped up by two supports 22. A person having ordinary skill in the art will understand that the system 2 is not limited to the use of two supports 22; a greater or fewer number of supports 22 can be used. A person having ordinary skill in the art will also understand that the supports 22 do not have to be limited to those shown in the drawings; any other type of supports 22 can be used as long as the supports 22 allow the bed 4 to tilt upward from the frame 8 and the angle of tilt is measurable. As suggested above, the degree of freedom of the bed 4 in the tilted configuration should be kept minimal. Thus, if two supports 22 are used as shown in the figures, the final position of both supports 22 should be synchronized and stable, allowing processor 16 can to take an accurate measurement from force measuring devices 14.

The center of gravity of the y-axis of the object 6 in the tilted configuration is calculated by the processor 16 by determining a difference between the location of the center of gravity of the object 6 along the y-axis in the flat configuration multiplied by the cosine of the angle of tilt and the center of gravity of the object 6 along an initial z-axis multiplied by the sine of the angle of tilt. This result is represented by the following equation:

$$CG_{y\_Angled}=\cos\theta*CG_{y\_Flat}-\sin\theta*CG_{z\_Flat} \quad (8)$$

To determine the center of gravity of the object 6 in the z-axis in a flat configuration, this equation can be rearranged to obtain equation (1) above. Similarly, to obtain the center of gravity of an object 6 in the z-axis in a tilted configuration, the following equation is used:

$$CG_{z\_Angled} = \sin\theta * CG_{y\_Flat} + \cos\theta * CG_{z\_Flat} \quad (9)$$

Figure 4:
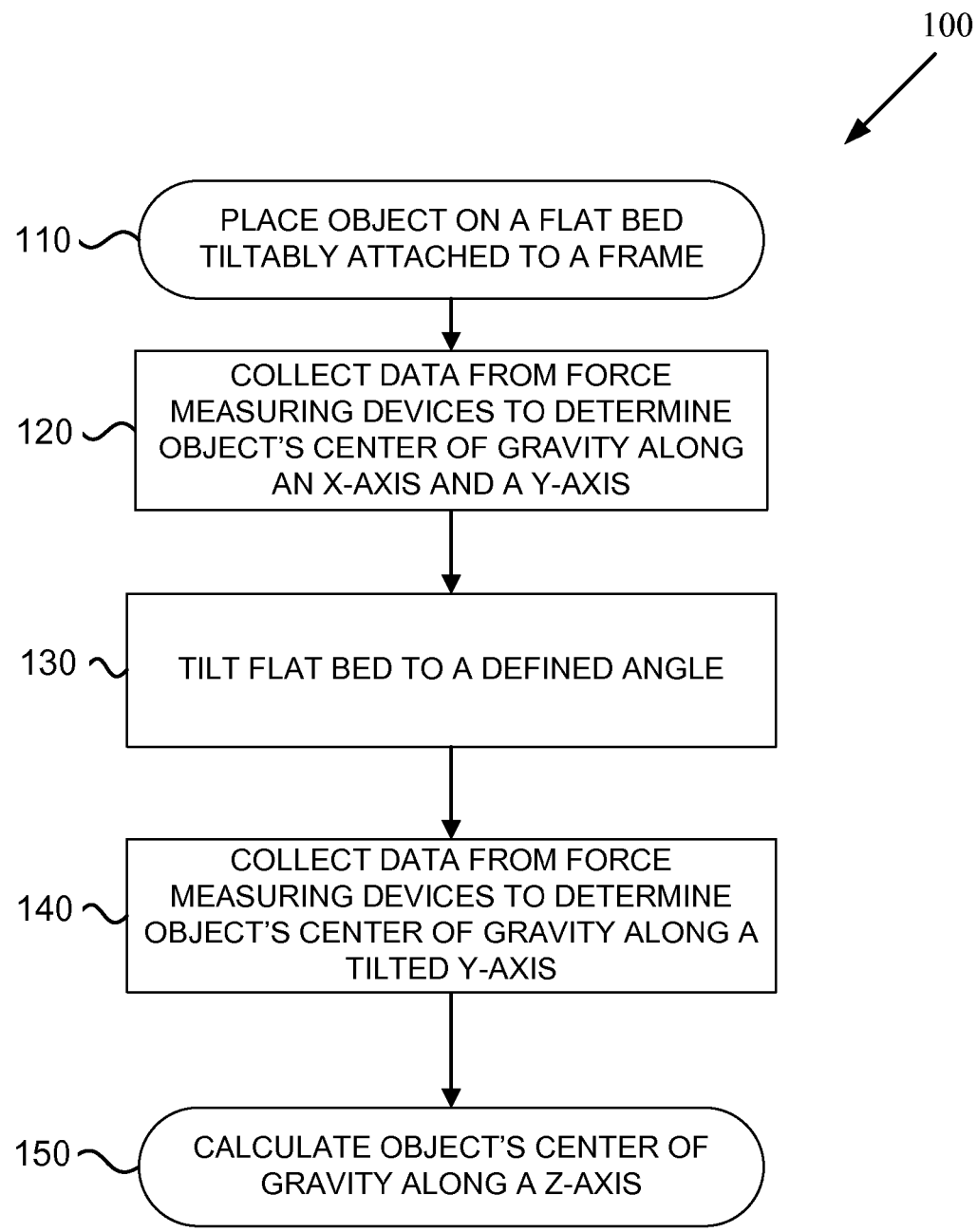
FIG. 4 shows an embodiment of a method for measuring an object's center of gravity.

FIG. 4 shows a method 100 for measuring an object's center of gravity. Method 100 may begin at step 110, which involves placing the object 6 on the flat bed 4. Step 120 then involves collecting data from the force measuring devices to determine the object's center of gravity along the x-axis and the object's center of gravity along a y-axis. Step 130 then involves tilting the flat bed 4 to a defined angle theta (A) as shown in FIG. 3. Step 140 then involves collecting data from the force measuring devices 14, such as by processor 16, to determine the object's center of gravity along a tilted-y-axis (determining the center of gravity along the x-axis in a tilted configuration is not necessary as the center of gravity in the x-axis will not change due to the tilt of the object 6). Then, at step 150, the object's center of gravity along a z-axis is calculated using equation (1) above. The greater the angle of tilt of the bed 4, the more accurate the measurement will be.

Noise should be eliminated from the calculation of the object's center of gravity. One source of noise results from movement of the object 6 on the flat bed 4. This is mitigated with proper use of stop 18 as previously described. A second source of noise results from subtracting out the influence of all non-object system hardware from the CG calculation. More uncertainty in the value of the system's CG (i.e., the system minus the object being measured), leads to more noise in the calculation of the object's CG. The center of gravity of the system should be known to an acceptable level of certainty prior to the final calculation. If the system's CG has been previously defined, the processor 16 can accept this parameter as a given. If the system's CG has not been defined, the processor can determine the system's CG using the techniques disclosed herein.

To get an accurate determination of the center of gravity of the object 6, the centers of gravity of the frame 8 and the bed 4 can be subtracted by the processor 16 from the calculation of the center of gravity of the bed 4 and frame 8 combined with the object 6. In a subject twenty-six inches wide by forty inches long, the accuracy is to within a tenth of an inch. Regarding scale, the size of the system should change as the scale of the object 6 changes.

Many modifications and variations of the System and Method for Measuring an Object's Center of Gravity are possible in light of the above description. Within the scope of the appended claims, the embodiments of the system and method described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system for measuring an object's center of gravity comprising:
 a bed for supporting the object in an immovable position, the bed tiltably attached to a frame that is supported near at least a first edge and a second edge by at least one force measuring device per edge, the bed being tiltable about one of the edges; and
 a processor configured to process force measurement data collected from each force measuring device,
 wherein the processor is configured to calculate the object's center of gravity along a z-axis based on a ratio of a cosine of the bed's angle of tilt multiplied by the center of gravity of the object along a y-axis in a flat configuration minus the center of gravity of the object along the y-axis in a tilted configuration to the sine of the angle of tilt.

2. The system for measuring an object's center of gravity as recited in claim 1 wherein the processor is further configured to measure the center of gravity of the object along an x-axis.

3. The system for measuring an object's center of gravity as recited in claim 2 further comprising a stop fixedly attached to the bed for preventing slip of the object between the flat and the tilted configurations.

4. The system for measuring an object's center of gravity as recited in claim 3, wherein a profile of the stop corresponds to a profile of the object.

5. The system for measuring an object's center of gravity as recited in claim 2, wherein the frame is supported by a first, a second, a third, and a fourth force measuring device.

6. The system for measuring an object's center of gravity as recited in claim 5, wherein the processor is further configured to calculate the center of gravity of a first horizontal side of the object along the x-axis by determining the result of a ratio between theسum of force data of the first and third force measuring devices and the sum of the first, second, third, and fourth measuring devices.

7. The system for measuring an object's center of gravity as recited in claim 6 wherein the processor is further configured to calculate the center of gravity of a second horizontal side of the object along the x-axis by determining the result of a ratio between the sum of force data of the second and fourth force measuring devices and the sum of the first, second, third, and fourth measuring devices.

8. The system for measuring an object's center of gravity as recited in claim 7, wherein the processor is further configured to calculate the center of gravity of the object along the x-axis by determining the average between the center of gravities of the first horizontal side and the second horizontal side of the object.

9. The system for measuring an object's center of gravity as recited in claim 8, wherein the processor is further configured to calculate the center of gravity of a first lateral side of the object along the y-axis by determining the result of a ratio between the sum of force data of the first and second force measuring devices and the sum of the first, second, third and fourth force measuring devices.

10. The system for measuring an object's center of gravity as recited in claim 9, wherein the processor is further configured to calculate the center of gravity of a second lateral side of the object along the y-axis by determining the result of a ratio between the sum of force data of the third and fourth force measuring devices and the sum of the first, second, third, and fourth force measuring devices.

11. The system for measuring an object's center of gravity as recited in claim 10, wherein the processor is further configured to calculate the location of the center of gravity of the object along the y-axis in a flat configuration by determining the average between the center of gravities of the first lateral side and the second lateral side of the object.

12. The system for measuring an object's center of gravity as recited in claim 11, wherein the processor is further configured to determine the center of gravity of the y-axis of the object in the tilted configuration by determining a difference between the location of the center of gravity of the object along the y-axis in the flat configuration multiplied by the cosine of the angle of tilt and the center of gravity of the object along an initial z-axis multiplied by the sine of the angle of tilt.

13. A method for measuring an object's center of gravity comprising the steps of:
- placing the object on a flat bed that is tiltably attached to a frame, the frame supported by a plurality of force measuring devices;
- collecting data from the force measuring devices to determine the object's center of gravity along an x-axis and to determine the object's center of gravity along a y-axis;
- tilting the flat bed to a defined angle;
- collecting data from the force measuring devices to determine the object's center of gravity along a tilted-y-axis; and
- calculating the object's center of gravity along a z-axis based on a ratio of a cosine of the bed's angle of tilt of the bed multiplied by the center of gravity of the object in a y-axis in a flat configuration minus the center of gravity of the object in the y-axis in a tilted configuration to the sine of the angle of tilt.

14. The method for measuring an object's center of gravity as recited in claim 13 further comprising the step of immovably adhering the object to the flat bed.

15. The method for measuring an object's center of gravity as recited in claim 14 further comprising the step of eliminating noise from the calculation of the object's center of gravity.

16. The method for measuring an object's center of gravity as recited in claim 15, wherein the noise is caused by movement of the object on the flat bed.

17. The method for measuring an object's center of gravity as recited in claim 13 further comprising the step of eliminating noise from the calculation of the object's center of gravity.

18. The method for measuring an object's center of gravity as recited in claim 17, wherein the noise is caused by movement of the object on the flat bed.

19. The method for measuring an object's center of gravity as recited in claim 13 further comprising the step of eliminating the center of gravity of the frame and the flat bed from the calculation of the object's center of gravity.

20. The method for measuring an object's center of gravity of claim 13 further comprising the step of determining the height of the object's center of gravity along a z-axis based on a ratio of a cosine of the bed's angle of tilt multiplied by the center of gravity of the object along a y-axis in a flat configuration minus the center of gravity of the object along the y-axis in a tilted configuration to the sine of the angle of tilt.

* * * * *